July 9, 1940.  A. M. STONER  2,207,524
CHUCK
Original Filed July 8, 1938
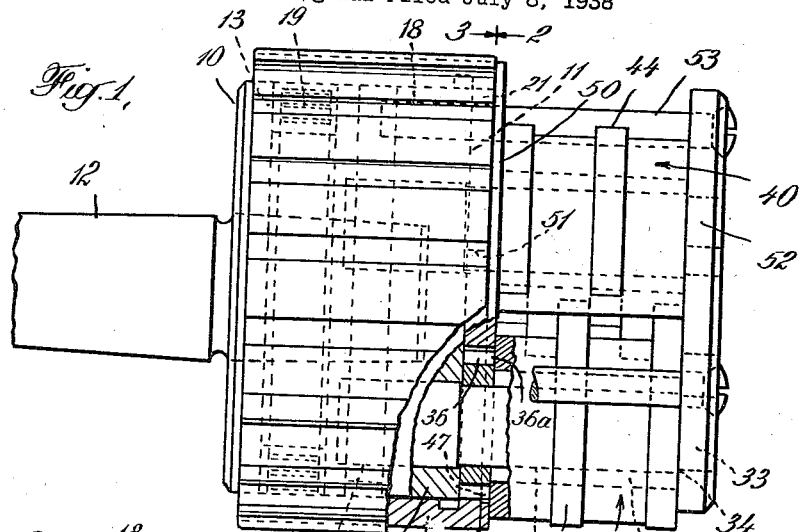
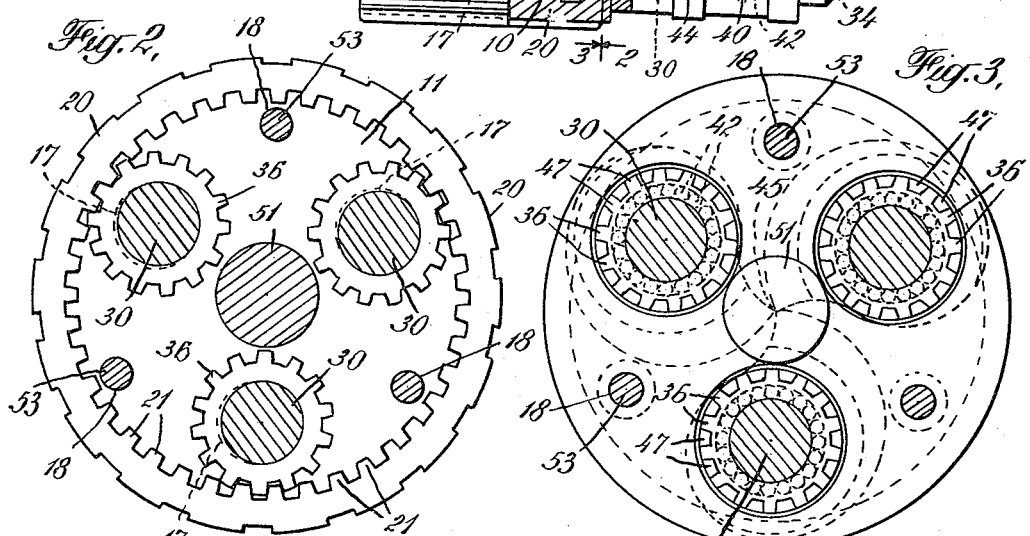
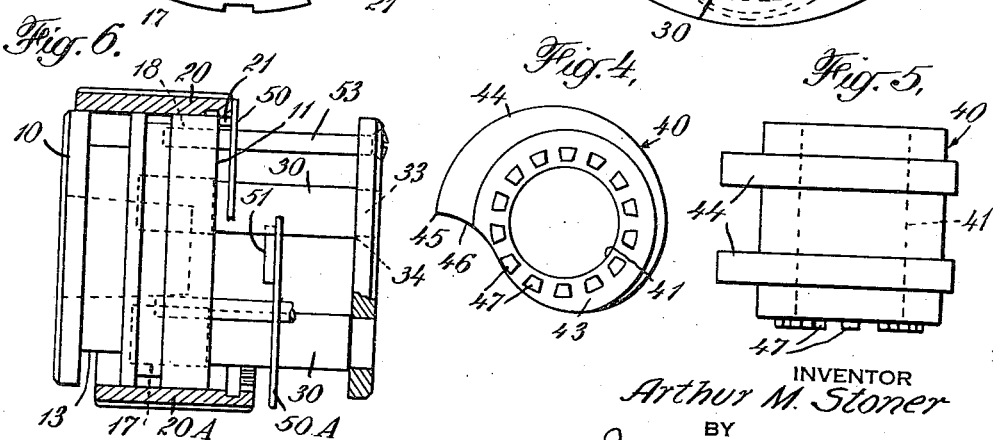
INVENTOR
Arthur M. Stoner
BY
Marshall & Hawley
ATTORNEYS Patented July 9, 1940

2,207,524

UNITED STATES PATENT OFFICE 2,207,524

CHUCK

Arthur Merrick Stoner, West Hartford, Conn., assignor to The Jacobs Manufacturing Company, Hartford, Conn., a corporation of Connecticut Original application July 8, 1938, Serial No. 218,111. Divided and this application December 5, 1938, Serial No. 243,998

6 Claims. (Cl. 279—33)

This invention relates to improvements in chucks.

Its object is to improve upon chucks of the type having a plurality of rotary tool engaging jaws and to provide a simple construction which can be assembled easily.

Another object is to increase the utility of chucks of this kind by arranging its parts to occupy a minimum of space.

A still further object is to provide a cage-like structure in which the gripping jaws and their supporting parts are uncovered and are open for inspection.

This application is a division of application Serial No. 218,111, filed July 8, 1938.

Referring to the drawing:

Fig. 1 is a side elevation with parts broken away to show some parts in section, of a chuck which is made according to and embodies my invention;

Fig. 2 is a sectional end elevation of the chuck shown in Fig. 1, the section being taken on the section line of Fig. 1 looking in the direction of the arrows 2—2;

Fig. 3 is a sectional end elevation of the chuck shown in Fig. 1, the section being taken on the section line of Fig. 1 looking in the direction of the arrows 3—3;

Fig. 4 is a rear end view of one of the gripping jaws;

Fig. 5 is a side elevation of the part shown in Fig. 4; and

Fig. 6 is a side elevation partly in section of parts of my improved chuck, showing some of the parts in different relative positions and illustrating the way the parts of the chuck are assembled.

10 designates the substantially cylindrical body of the chuck having a transverse face 11. 12 is an arbor tapered to fit an axial hole in the body and adapted to fit the driven socket of a machine tool, such as a power drill. 13 is an annular groove near the rear end of the body in which is a spiral spring 19.

Three post holes 17 are drilled into the body from its outer face. These are equally spaced angularly and are at equal distances from the central axis of the body. Between them are tapped holes 18.

20 is a sleeve rotatably supported on the body 10. At its forward end is an internally toothed flange 21 which overlaps the outer face 11 of the body. The ends of the spring 19 are attached to the body 10 and to the sleeve to cause the sleeve to rotate on the body in an anti-clockwise direction as viewed from the front of the chuck (Fig. 2). It may be rotated in the opposite direction by hand, by the operator grasping the outer surface of the sleeve which is fluted as shown, to facilitate such operation.

Posts 30 are fitted into and seated upon the bottoms of the holes 17. The outer end 33 of each post is of reduced diameter and forms a shoulder 34.

Pinions 36 fit the posts 30 rotatively. These are in mesh with the teeth of the flange 21 of sleeve 20. They are of sufficient thickness to extend, when seated on the face 11 of body 10, beyond the flange 21, as shown at 36a in Fig. 1.

40 designates the clamping jaws. These have cylindrical bores 41 which fit the posts 30 with interposed rollers 42. Each jaw has a body with an eccentric portion 43 and spaced eccentric ribs 44, terminating in sharp edges 45 from which they are under-cut on a curve 46 (Fig. 4), back to the body portion 43 which is nearest the axis of the bore 41. The contour of the ribs 44 is alike on all of the jaws, but they are spaced differently on each jaw, as shown in Fig. 1, so that their edges 45 can be moved together to a common axis, as shown in Fig. 3.

From one end of each jaw, a row of crown teeth 47 projects. These are concentric with the bore 41 and their outer diameter is somewhat less than that of the body portion 43. When assembled these teeth fit between the parts 36a of the pinion teeth which extend above the rim teeth 21, as shown in Figs. 1 and 3.

50 is a cover plate which is provided with clearance holes for the pinions 36 and the teeth 47. This lies on the front surface of the rim flange in the space between it and the lower ends of the body portions 43 of the clamping jaws. This cover plate may also have a central boss 51 which extends to and rests upon the face 11 of the chuck body 10.

52 is a clamping plate having perforations through which the ends 33 of the adjusting posts extend. This clamping plate rests on the shoulders 34 of the posts. It is held in place by screws 53 which pass through it and into engagement with the threaded holes 18 in the body 10.

The teeth 47 are so positioned in relation to the teeth of pinions 36 that the edges 45 of the ribs 44 of the clamping jaws are approximately in the axis of the body 10 when the sleeve is moved in relation to body 10 by spring 19 to its extreme position. This is shown in Fig. 3.

In Fig. 6 the posts 30 are shown positioned in the holes 17 in body 10. In assembling the parts, the sleeve 20 is slipped longitudinally over the body. In the lower part of Fig. 6 it is shown at 20A as partially positioned. It is moved further until its toothed flange rests upon the face 11, as shown in the upper part of Fig. 6. The cover plate is put in place by moving it from the position 50A (lower part of Fig. 6), up to abutting relation with the end of sleeve 20 with its boss 51 resting on the face 11 of body 10 (upper part of Fig. 6). Next, the pinions 36 are slipped over the posts 30, through the clearance holes in cover plate 50 and into engagement with the toothed flange 21. The gripping jaws 40 with rollers 42 within them are then put on the posts and moved along the posts until the teeth of their crown gears mesh with the parts 36a of the pinions which project through the cover plate 50. In this position the inner ends of rollers 42 rest upon the uncut hubs of pinions 36.

With the parts thus assembled, the clamping plate 52 is placed on the reduced end portions 33 of the posts and then held in place by the screws 53. This securely clamps the posts 30 in place and the plate 52 serves to hold the clamping jaws, rollers and pinions against longitudinal movement and through the clamping jaws and cover plate, the sleeve 20 is held on the body 10.

The cage-like structure formed by the posts 30 and screws 53 between the cover plate 50 and the clamping plate 52 is of the smallest possible outside diameter necessary to support the clamping jaws; in fact, none of it extends beyond the outer parts of the jaws themselves. It has the further advantage of being an open structure so that extraneous material will not collect within it and the clamping jaws may be inserted readily. The cover plate keeps chips and other material out of the gears.

The chuck can be easily operated while in rotation. A slight pressure of the hand on the sleeve is sufficient to move the jaws from their fully closed position shown in Fig. 3 toward their fully opened position. Then a tool is inserted and the hand released. The spring moves the jaws inwardly and the grip on the tool is instantaneous and self-tightening. If this release of the chuck while in rotation is not desired, the spring may be omitted.

Structural modifications may be made within the spirit and scope of this invention and I intend no limitations other than those imposed by the appended claims.

What I claim is:

1. A chuck comprising a body, a sleeve rotatively supported by the body, said sleeve having a flange overlapping the end of the body, a gear on said sleeve, angularly spaced posts projecting from one end of the body, pinions rotatively mounted on the posts in mesh with said gear, clamping jaws rotatively mounted on the posts, one end of each of said jaws abutting the flange on the sleeve, non-rotative connections between the pinions and the jaws, a clamping plate on the posts for retaining the sleeve on the body and the pinions and clamping jaws on the posts, and screws between and parallel with the posts for attaching the clamping plate to the body.

2. A chuck comprising a body, a sleeve rotatively supported by the body, an internally toothed flange on the sleeve overlapping the end of the body, angularly spaced posts projecting from one end of the body, pinions rotatively mounted on the posts in mesh with said toothed flange, clamping jaws rotatively mounted on the posts, non-rotative connections between the pinions and the jaws, a clamping plate on the posts for retaining the pinions and clamping jaws on the posts, and screws between and parallel with the posts for attaching the clamping plate to the body.

3. A chuck comprising a body, a sleeve rotatively supported by the body, an internally toothed flange on the sleeve overlapping the end of the body, angularly spaced posts projecting from one end of the body, pinions rotatively mounted on the posts in mesh with said toothed flange, clamping jaws rotatively mounted on the posts, one end of each of said jaws overlying the flange on the sleeve, non-rotative connections between the pinions and the jaws, rollers interposed between the posts and the jaws abutting the pinions, a clamping plate on the posts abutting the other end of each jaw for retaining the sleeve on the body, the rollers in contact with the pinions and the pinions and clamping jaws on the posts, and screws between and parallel with the posts for attaching the clamping plate to the body.

4. A chuck comprising a body, a sleeve rotatively supported by the body, an internally toothed flange on the sleeve overlapping the end of the body, angularly spaced posts projecting from one end of the body, pinions rotatively mounted on the posts in mesh with said toothed flange, a cover plate overlapping the sleeve constructed with clearance holes for the pinions, clamping jaws rotatively mounted on the posts and abutting said cover plate, non-rotative connections between the pinions and the jaws, a clamping plate on the posts for retaining the pinions and clamping jaws on the posts and for holding the cover plate against the sleeve, and screws between and parallel with the posts for attaching the clamping plate to the body.

5. A chuck comprising a body, a sleeve rotatively supported by the body, an internally toothed flange on the sleeve overlapping the end of the body, a cover plate over said flange, angularly spaced posts projecting from one end of the body, the end portions of said posts being of reduced diameter and forming shoulders, pinions rotatively mounted on the posts in mesh with said toothed flange, clamping jaws rotatively mounted on the posts one end of said jaws abutting the cover plate, non-rotative connections between the pinions and the jaws, a clamping plate on the reduced portions of the posts and abutting their shoulders and the other end of the jaws to retain the pinions and clamping jaws on the posts to hold the cover plate against the sleeve, and screws between and parallel with the posts for attaching the clamping plate to the body.

6. A chuck comprising a body, a sleeve rotatably supported by the body, an internally toothed flange on the sleeve overlapping the end of the body, angularly spaced posts projecting from one end of the body, the end portions of said posts being of reduced diameters and forming shoulders, pinions rotatively mounted on the posts in mesh with said toothed flange, a cover plate overlapping the toothed flange constructed with clearance holes for the pinions, clamping jaws rotatively supported on the posts and abutting said cover plate, non-rotative connections between the pinions and the jaws, a clamping plate on the reduced end portions of the posts and abutting their shoulders for retaining the pinions and jaws on the posts and for holding the cover plate against the toothed flange, and screws between and parallel with the posts for attaching the clamping plate to the body.

ARTHUR MERRICK STONER.